C. SCHOFIELD & R. WILDE.
LAPPING-MACHINE.

No. 180,161. Patented July 25, 1876.

Witnesses:
Benj. Morison
Wm. H. Morison

Inventors:
Charles Schofield
Robert Wilde

UNITED STATES PATENT OFFICE.

CHARLES SCHOFIELD AND ROBERT WILDE, OF MANAYUNK, PHILADELPHIA, PENNSYLVANIA.

IMPROVEMENT IN LAPPING-MACHINES.

Specification forming part of Letters Patent No. 180,161, dated July 25, 1876; application filed March 17, 1876.

*To all whom it may concern:*

Be it known that we, CHARLES SCHOFIELD and ROBERT WILDE, of Manayunk, in the city of Philadelphia and State of Pennsylvania, have invented a new and useful Improvement in Lapping-Machines, which improvement is fully set forth in the annexed specification, reference being had to the accompanying drawings, in which—

Figure 1:
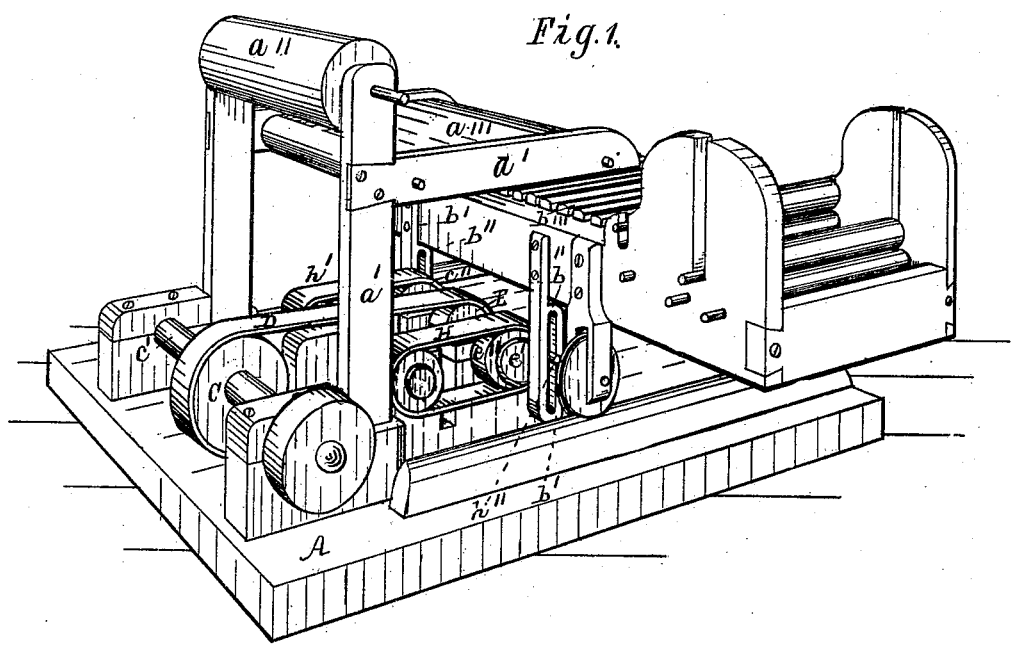
Figure 2:
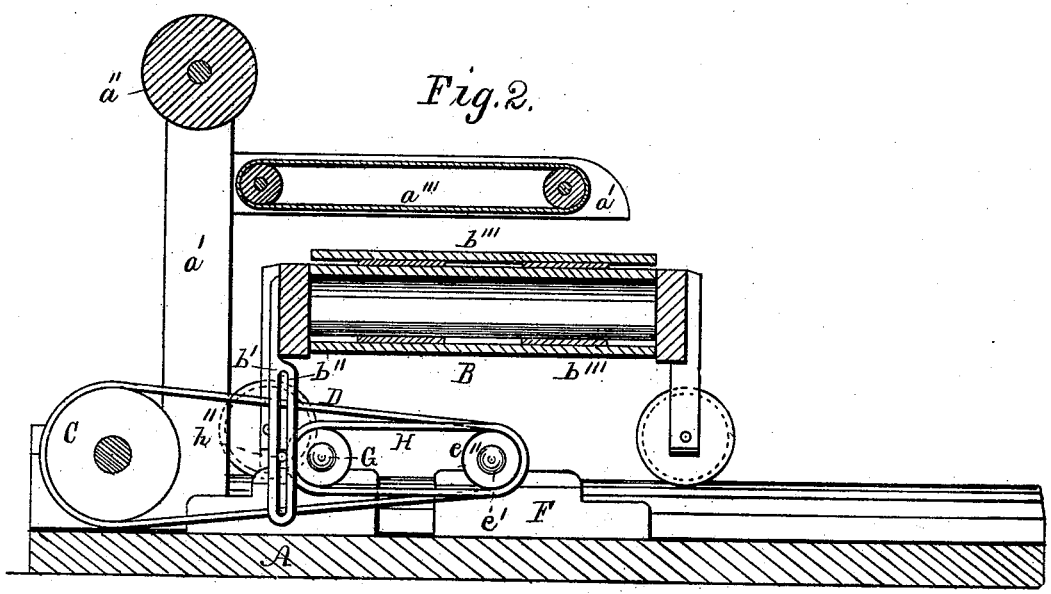

Figure 1 is a perspective view of a lapping-machine embodying our invention; and Fig. 2, a vertical longitudinal section of the same machine, with the carriage moved to its limited extent inward.

The carriages of the lapping-machines heretofore used are moved inward and outward alternately by means of respective racks and pinions, which are attended with several objections, among which may be mentioned the binding effect produced between the grooved or flanged rims of the carriage-wheels and the tracks, in consequence of the fact that the rack is necessarily attached by one of its ends, and at a right angle to one end of the carriage, and also the frequent breaking off of the teeth of the rack or pinion on the changing of the backward and forward movements given to the carriage, thus requiring the substitution of an entirely new rack or pinion, and consequently involving expense and delay.

The object of our invention is to obviate the objections stated above by the arrangement and combination, with the stationary platform of the machine, and the reciprocating or moving carriage thereof, of a series of pulleys and bands, substantially as will now be described.

The stationary platform A, with its upright frame $a'$ $a'$ $a'$, for supporting the feed-cylinder $a''$ and the apron $a'''$, and also the reciprocating carriage B, are constructed and arranged in relation to each other as heretofore.

In Fig. 1 the carriage is shown as moved outward, and in Fig. 2 as moved inward, each to the limited extent of its movements when the machine is in operation.

The reciprocating movements of the carriage B are produced by the herein-described mechanism, viz: C is a pulley fixed on the middle of the usual driving-shaft $c'$, and is connected by a band, D, with a smaller pulley, E, which is fixed in the middle of a shorter shaft, $e'$, that carries on each of its projecting ends a like pulley, $e''$—the said shaft $e'$ being supported parallel with shaft $c'$, upon two bearings, F, each between the middle pulley E and one of the end pulleys $e''$. (See Fig. 1.) Another short shaft, G, is supported upon bearings in the same manner, and provided with end pulleys, so as to be parallel and in alignment with the respective shaft and end pulleys of shaft $e'$. The two end pulleys on the respective outer ends of the shafts $e'$ and G are connected by respective bands H $h'$, and each of said bands has a transversely-projecting arm of iron or steel, $h''$, firmly riveted so as to project outward at a right angle to the band, and serve as a wrist-pin in giving the requisite reciprocations of the carriage B. The said arms $h''$ $h''$ are adjusted in alignment with each other, and are cylindrical in form.

Firmly bolted in vertical positions to the vertical inner side of the frame of the carriage B are two downward-projecting irons, $b'$ $b'$, arranged so as to be directly opposite to the sides of the respective arms $h''$ $h''$ of the bands H $h'$. Each of the downward-projecting irons $b'$ $b'$ has a long vertical mortise, $b''$, into which the respective arms $h''$ $h''$ are entered, and thus the requisite connection of the carriage B with the moving bands H $h'$ is made.

The carriage is provided with a traveling apron, $b'''$, operated in the usual manner, and the carriage supported upon track-wheels, as heretofore; and it will be evident, without any further description or explanation, that our said invention, when put in operation by the rotary motion of the shaft which carries the pulley C, will not be subject to any of the objections to which the rack and pinion heretofore used is liable, and that a uniform, smooth, unstrained, and noiseless reciprocating motion of the carriage B will be the result; and, moreover, that the original cost of our said invention, constructed and applied as described, will be much less than that of the rack-and-pinion device, and also much less liable to breaks and consequent delays.

We claim as our invention—

1. In a lapping-machine, the combination, substantially as described, of the pulleys C and E, their connecting-band D, the four pulleys on the shafts G and $e'$, and their two bands, H and $h'$, provided with the respective projecting arms $h''$ $h''$, rigidly fixed thereon, with the platform A of the machine.

2. In a lapping-machine, the combination, substantially as described, of the reciprocating carriage B, having the downward-projecting mortised irons $b'$ $b'$, with the arms $h''$ $h''$ of the bands H $h'$.

CHARLES SCHOFIELD.
ROBERT WILDE.

Witnesses:
 BENJ. MORISON,
 WM. H. MORISON.